United States Patent
Silverbrook et al.

(10) Patent No.: US 7,286,162 B2
(45) Date of Patent: **\*Oct. 23, 2007**

(54) PHOTOGRAPH INCLUDING CODED IMAGE DATA

(75) Inventors: Kia Silverbrook, Balmain (AU); Paul Lapstun, Balmain (AU); Simon Robert Walmsley, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 27 days.

This patent is subject to a terminal disclaimer.

(21) Appl. No.: 11/124,044

(22) Filed: May 9, 2005

(65) Prior Publication Data

US 2005/0201743 A1  Sep. 15, 2005

Related U.S. Application Data

(63) Continuation of application No. 09/693,134, filed on Oct. 20, 2000, now Pat. No. 6,924,835.

(51) Int. Cl.
*H04N 5/225* (2006.01)
*H04N 5/76* (2006.01)
*G03B 17/24* (2006.01)
*B41J 3/00* (2006.01)

(52) U.S. Cl. ............... 348/207.99; 348/231.3; 396/310

(58) Field of Classification Search ......... 348/207.99, 348/207.2, 231.99, 231.3–231.6; 396/310, 396/315–318
See application file for complete search history.

(56) References Cited

U.S. PATENT DOCUMENTS

| | | | |
|---|---|---|---|
| 5,164,831 A | 11/1992 | Kuchta et al. | |
| 5,514,860 A | 5/1996 | Berson et al. | |
| 5,547,501 A | 8/1996 | Maruyama et al. | |
| 5,726,693 A | 3/1998 | Sharma et al. | |
| 5,761,219 A | 6/1998 | Maltsev | |
| 5,896,403 A | 4/1999 | Nagasaki et al. | |
| 5,996,893 A * | 12/1999 | Soscia | 235/462.01 |
| 6,102,505 A | 8/2000 | McIntyre et al. | |
| 6,106,147 A | 8/2000 | Silverbrook et al. | |
| 6,191,406 B1 * | 2/2001 | Nelson et al. | 250/208.1 |
| 6,322,181 B1 * | 11/2001 | Silverbrook | 347/2 |
| 6,496,654 B1 | 12/2002 | Silverbrook et al. | |

FOREIGN PATENT DOCUMENTS

| | | |
|---|---|---|
| EP | 735420 A1 * | 10/1996 |
| EP | 974924 | 1/2000 |
| JP | 07-001874 | 1/1995 |
| JP | 2000/141788 | 5/2000 |
| JP | 2000-207512 | 7/2000 |
| WO | WO99/04368 | 1/1999 |

\* cited by examiner

*Primary Examiner*—Vivek Srivastava
*Assistant Examiner*—Timothy J Henn

(57) ABSTRACT

A photograph having coded image data disposed thereon is provided. The image data corresponds to a digital image of the photograph, thereby facilitating reproduction of the image from the photograph.

5 Claims, 7 Drawing Sheets

UPPER LEFT CLOCKMARKS AND BORDER

LOWER RIGHT CLOCKMARKS AND BORDER

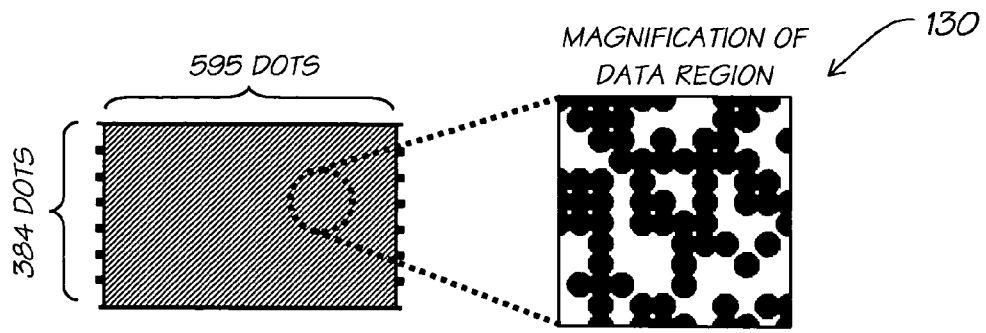
FIG. 10
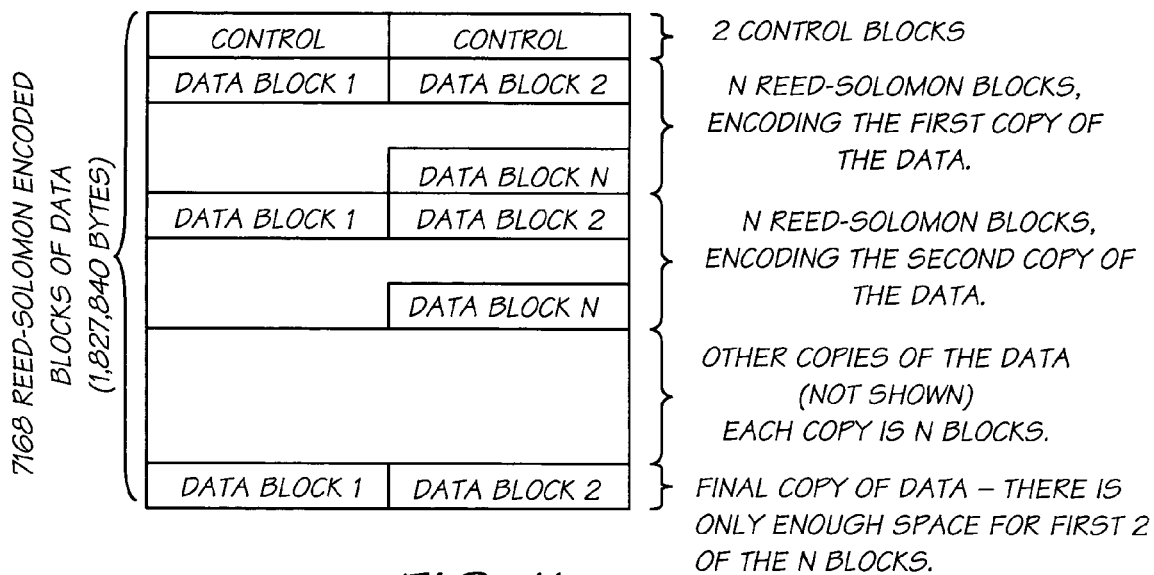
FIG. 11
```
00: 4F 00 3D 4F 00 3D 4F 00 3D 4F 00 3D
0C: 4F 00 3D 4F 00 3D 4F 00 3D 4F 00 3D
18: 4F 00 3D 4F 00 3D 4F 00 3D 4F 00 3D
24: 4F 00 3D 4F 00 3D 4F 00 3D 4F 00 3D
30: 4F 00 3D 4F 00 3D 4F 00 3D 4F 00 3D
3C: 4F 00 3D 4F 00 3D 4F 00 3D 4F 00 3D
48: 4F 00 3D 4F 00 3D 4F 00 3D 4F 00 3D
54: 4F 00 3D 4F 00 3D 4F 00 3D 4F 00 3D
60: 00 00 00 00 00 00 00 00 00 00 00 00
6C: 00 00 00 00 00 00 00 00 00 00 00 00
78: 00 00 00 00 00 00 00 00 00 00 00 00
```
} 32 COPIES OF THE 3 BYTE CONTROL INFORMATION
} RESERVED BYTES ARE 0
FIG. 12

PHOTOGRAPH INCLUDING CODED IMAGE DATA

CROSS REFERNCE TO RELATED APPLICATION

This is a Continuation Application of U.S. application Ser. No. 09/693,134, filed on Oct. 20, 2000 now U.S. Pat. No. 6,924,835, all of which is herein incorporated by reference.

FIELD OF THE INVENTION

The present invention relates to a data processing method and apparatus and, in particular, discloses a data encoding method and apparatus for storing data on photographs using an ink jet printing system using an infra-red ink wherein the data is original image data taken from a camera system and transformed image data corresponding to the original image data transformed by an image processing program loadable into said camera system.

CO-PENDING APPLICATIONS

Various methods, systems and apparatus relating to the present invention are disclosed in the following co-pending applications filed by the applicant or assignee of the present invention simultaneously with the present application:

| U.S. patent application/Grant Ser. No. |
| --- |
| 6496654 |
| 6859225 |
| 6647369 |
| 6943830 |
| 09/693317 |

The disclosures of these co-pending applications are incorporated herein by reference.

Various methods, systems and apparatus relating to the present invention are disclosed in the following co-pending application filed by the applicant or assignee of the present invention on Jul. 10, 1998:

U.S. Pat. No. 6,476,863
U.S. Pat. No. 6,459,495

The disclosures of this co-pending application are incorporated herein by reference.

Various methods, systems and apparatus relating to the present invention are disclosed in the following co-pending applications filed by the applicant or assignee of the present invention on Jun. 30, 2000:

| | |
| --- | --- |
| USSN 6,471,331 | |
| USSN 6,676,250 | USSN 6,347,864 |
| USSN 6,439,704 | |
| USSN 6,425,700 | USSN 6,588,952 |

The disclosures of these co-pending applications is incorporated herein by reference.

BACKGROUND OF THE INVENTION

As the applicant has previously noted in pending applications U.S. Pat. No. 6,476,863 and U.S. Pat. No. 6,459,495 there is a general need for a print media scanning system that allows for high volumes of computer data to be stored on a simple print media, such as a card while simultaneously tolerating a high degree of corruption when read by a scanning device. For example, the form of distribution can suffer a number of data corruption errors when the surface is scanned by a scanning device. The errors can include:

1. Dead pixel errors which are a result of reading the surface of the card with a linear CCD having a faulty pixel reader for a line thereby producing the same value for all points on the line.
2. Preferably, the system adopted can tolerate errors wherein text is written by the owner of the card on the surface. Such errors are ideally tolerated by any scanning system scanning the card.
3. Various data errors on the surface of the card may arise and any scuffs or blotches should be tolerated by any system determining the information stored on the surface of the card.
4. A certain degree of "play" exists in the insertion of the card into a card reader. This play can comprise a degree of rotation of the card when read by a card reader.
5. Further, the card reader is assumed to be driven past a linear image sensor such as a CCD by means of an electric motor. The electric motor may experience a degree of fluctuation which will result in fluctuations in the rate of transmission of the data across the surface of the CCD. These motor fluctuation errors should also be tolerated by the data encoding method on the surface of the card.
6. The scanner of the surface of the card may experience various device fluctuations such that the intensity of individual pixels may vary. Reader intensity variations should also be accounted for in any system or method implemented in the data contained on the surface of the card.

Ideally, any scanning system should be able to maintain its accuracy in the presence of errors due to the above factors.

In applications U.S. Pat. No. 6,476,863 and U.S. Pat. No. 6,459,495, the applicant disclosed a method and apparatus for printing data in an encoded fault tolerant form on the back of a photograph preferably using black ink on a white background. The data represented the photograph in a digital image file format and/or data comprising a computer program script which could be run to recreate the image or to apply some effect to the image. A programming language called a VARK script was invented for this purpose which was designed to be portable and device independent.

SUMMARY OF THE INVENTION

The present invention seeks to provide an alternative to that method of encoding and printing data by recording two images, one image corresponding to the original image data received from a camera system and the second image corresponding to a version of said image produced by transforming the original image with an image processing program which can be loaded into the camera system, said method including printing the two images in an encoded fault tolerant digital form over or with the original image itself using infra-red ink, the image and the data being recorded on a print media using an ink jet printing system as formerly disclosed by the applicant.

It is an object of the present invention to provide for a method of printing digital data on a photograph wherein the data is image data from a camera system and that image data transformed by an image processing program, the method including the steps of:

a) receiving image data corresponding to an image from a camera system;

b) transforming said image data with an image processing program the steps of which can be loaded into said camera system;

c) converting said original image data and said transformed image data into an encoded fault tolerant digital form;

d) printing out said fault tolerant digital form of said original image data and said transformed image data using an ink jet printing process with an infra-red ink on a surface of a print media while simultaneously printing out said original image data as a photographic image in a visual, human readable form on the same surface of the said print media.

Preferably, said encoding step includes compressing said image data and processing it using a Reed-Solomon algorithm. In order to accommodate two images in the same space that in other forms of the invention may only accommodate a single copy of the image greater compression of the image data and the transformed image data may be required.

The invisible ink may be an infra-red absorbing ink with negligible absorption in the visible spectrum.

It is a further object of the invention to provide apparatus for printing in infra-red ink encoded fault tolerant digital data on a photograph, said apparatus including:

a) a camera system for imaging an image including means for outputting said image in a digital format; said camera system further including means for inputting an image processing program;

b) means for processing said digital format of said image into a transformed version of said image according to steps of said image processing program;

c) means for converting said digital format of said image and said transformed version of said image into a fault tolerant encoded digital form;

d) means for printing said image and said fault tolerant encoded digital form using an ink jet printing process said fault tolerant encoded digital form being printed using an infra-red ink.

Preferably, the means for printing employs a page width printhead using an ink jet structure, for example, as disclosed in applicant's U.S. Pat. No. 6,471,331, U.S. Pat. No. 6,676,250, U.S. Pat. No. 6,347,864, U.S. Pat. No. 6,439,704, U.S. Pat. No. 6,425,700, and U.S. Pat. No. 6,588,952 with a print roll feeding print media therethrough, for example as disclosed in applicant's Artcam applications, U.S. Pat. No. 6,476,863 and U.S. Pat. No. 6,459,495.

According to a preferred form of the invention the information is printed out on a photograph which may be the standard size of approximately 102 mm×152 mm (4"×6") compared to the prior art data encoded card previously disclosed by the applicant which has a format of 86 mm×55 mm (approximately the size of a credit card). The increased size of the recording media allows nearly four times as much data to be recorded compared to the previous format while using a similar or identical data encoding technique. By recording the data onto the same surface as the photograph bearing the image only one pagewidth printhead is required rather than the two printheads such as were disclosed in the applicant's application U.S. Ser. No. 09/113,070 (Docket No. ART02US).

BRIEF DESCRIPTION OF THE DRAWINGS

Notwithstanding any other forms which may fall within the scope of the present invention, preferred forms of the invention will now be described, by way of example only, with reference to the accompanying drawings in which:

FIG. 10 illustrates the array of dots of a datablock;

FIG. 11 illustrates schematically the structure of data for Reed-Solomon encoding;

FIG. 12 illustrates in hexadecimal notation the structure of control block data before Reed-Solomon encoding;

DESCRIPTION OF THE PREFERRED EMBODIMENT

Figure 1:
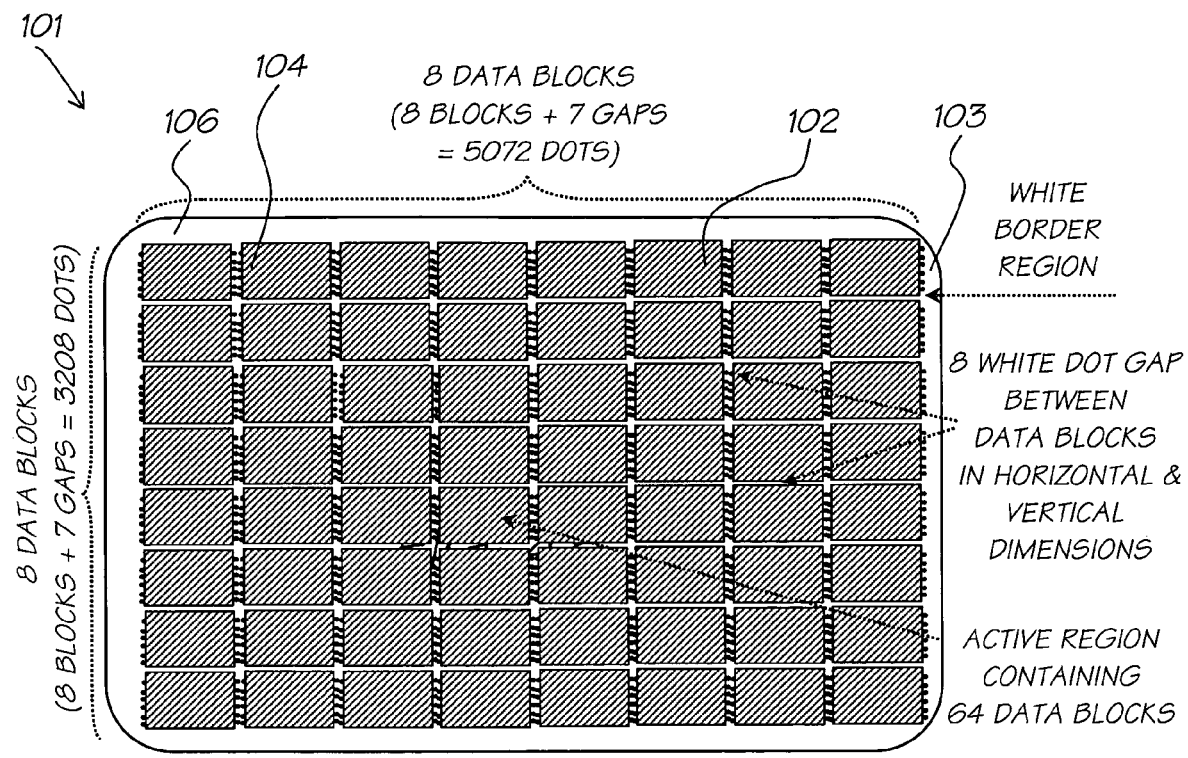
FIG. 1 illustrates the data surface of a card or photograph.

The present invention includes, preferably, an ink jet printing system having at least four ink jet print nozzles per printed dot in a pagewidth printhead. The four inks would be cyan, magenta, and yellow for printing a color image and an infra-red (IR) ink for printing data in an encoded fault tolerant form along with the color image. One such ink jet printhead which can print using four inks is disclosed in the applicant's co-pending applications U.S. Pat. No. 6,676,250, U.S. Pat. No. 6,347,864, U.S. Pat. No. 6,439,704, U.S. Pat. No. 6,425,700 and U.S. Pat. No. 6,588,952.

Infra-red inks suitable for use with the current invention are disclosed in the applicant's co-pending applications, Australian provisional patent applications PQ9412 and PQ9376 both filed on Aug. 14, 2000 and applicant's applications PQ9509 filed on Aug. 18, 2000, and PQ9571, and PQ9561 filed on Aug. 21, 2000.

Techniques that can be used to encode the information for printing in infra-red ink are disclosed in the applicant's co-pending application U.S. Pat. No. 6,476,863 and U.S. Pat. No. 6,459,495 the description of which is incorporated herein by reference. These techniques were described as Artcard or Dotcard formats. In these applications, the data was printed on the back of a card of size 85 mm×55 mm in an active data area of 80 mm×50 mm. In this way 967 Kbytes of data was fault tolerantly encoded as 1.89 Mbytes of data using 15,876,000 printed dots.

Encoded Data Format

Of course while other encoded data formats are possible, there will now be described one such encoded data format with a number of preferable features.

Encoded Data Overview

The Encoded data can be used to recover the image over which it is written or to provide a digital format thereof for manipulation in applications, for example transmission over a digital telecommunication network or image processing in a computer.

Encoded data technology can also be independent of the printing resolution. The notion of storing data as dots on print media simply means that if it is possible to put more dots in the same space (by increasing resolution), then those dots can represent more data. The preferred embodiment assumes utilization of 1600 dpi printing on a 102 mm×152 mm (4"×6") size photograph as the sample photograph, but it is simple to determine alternative equivalent layouts and data sizes for other photograph sizes and/or other print resolutions. For example, in the applicant's ink jet printing camera system a panoramic print can also be produced which is twice the length of the standard size photograph allowing twice the data to be recorded enhancing redundancy of the image data. Regardless of the print resolution, the reading technique remains the same. After all decoding and other overhead has been taken into account, the encoded data format is capable of storing 3 to 4 Megabyte of data for a 4"×6" print size at print resolutions up to 1600 dpi. More encoded data can be stored at print resolutions greater than 1600 dpi.

Format of Encoded Data

The structure of data on the photograph is therefore specifically designed to aid the recovery of data. This section describes the format of the data on a photograph. This format was previously described as the "alternative Artcard" format in applicant's applications U.S. Pat. No. 6,476,863 and U.S. Pat. No. 6,459,495.

Dots

The dots printed on the photograph are in infra-red ink with or over a color image. Consequently a "data dot" is physically different from a "non-data dot". When the photograph is illuminated by an infra-red source having complementary spectral properties to the absorption characteristics of the IR ink the data appears as a monochrome display of "black" on "white" dots. The black dots correspond to dots were the IR ink is and has absorbed the IR illumination and "white" dots correspond to areas of the color image over which no IR ink has been printed and reflecting the IR illumination substantially unattenuated or only partially attenuated. Hereinafter the terms black and white as just defined will be used when referring to the IR ink dots recording data.

In describing this embodiment, the term dot refers to a physical printed dot (of IR ink) on a photograph. When an encoded data reader scans encoded data, the dots must be sampled at at least double the printed resolution to satisfy Nyquist's Theorem. The term pixel refers to a sample value from an encoded data reader device. For example, when 1600 dpi dots are scanned at 4800 dpi there are 3 pixels in each dimension of a dot, or 9 pixels per dot. The sampling process will be further explained hereinafter.

Turning to FIG. 1, there is shown the data surface 101 illustrating a sample of encoded data. Each photograph having encoded data consists of an "active" region 102 surrounded by a border region 103. The border 103 contains no data information, but can be used by an encoded data reader to calibrate signal levels. The active region is an array of data blocks e.g. 104, with each data block separated from the next by a gap of 8 image dots e.g. 106. Depending on the print resolution, the number of data blocks on a photograph will vary. On a 1600 dpi printed photograph of 4"×6", the array can be 15×14 data blocks in an area of approximately 97 mm.×147 mm. for 2.5 mm margins. Each data block 104 has dimensions of 627×394 dots with an inter-block gap 106 of 8 image dots.

Data Blocks

Figure 2:
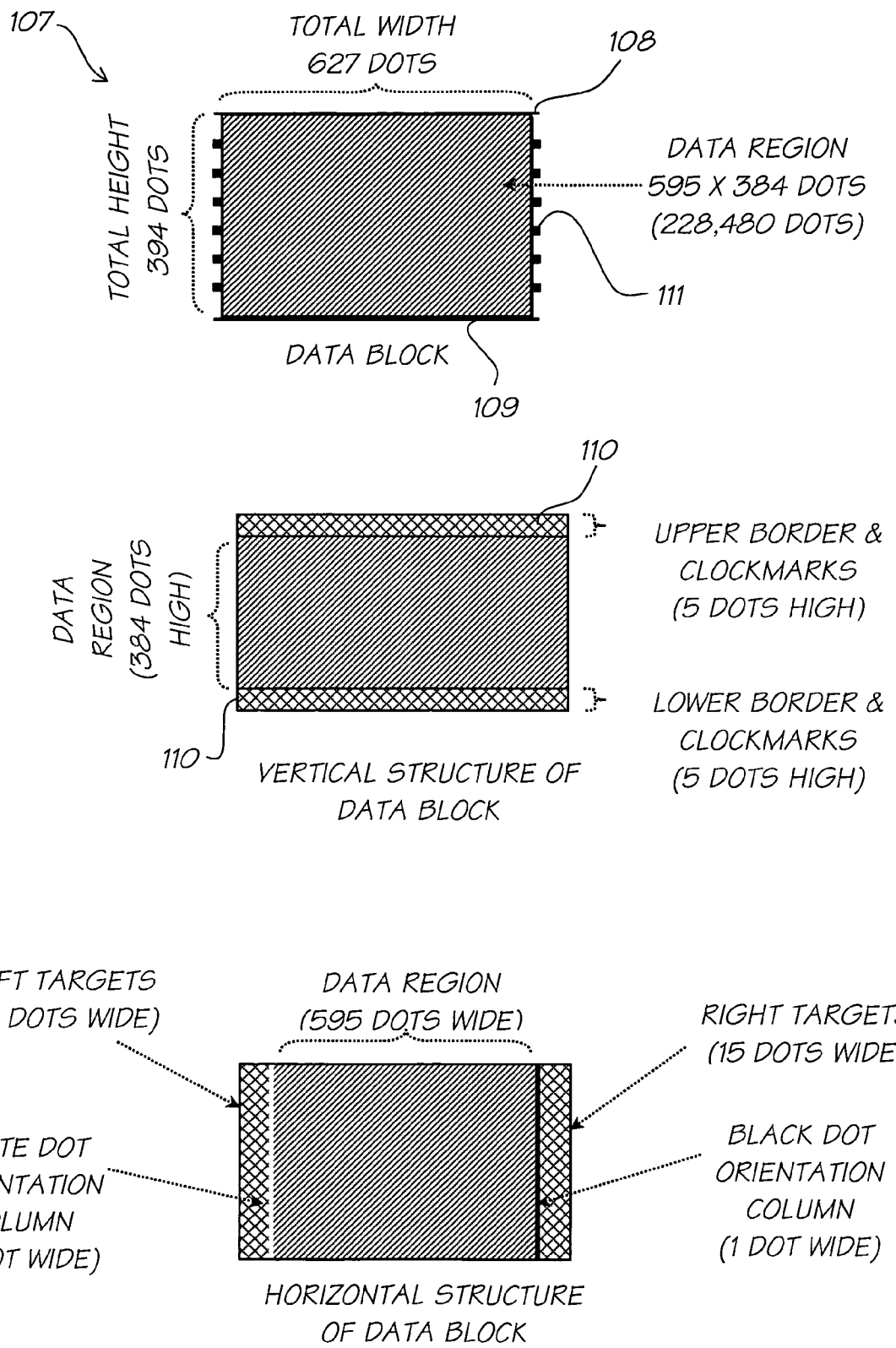
FIG. 2 illustrates schematically the layout of a single data block.

Turning now to FIG. 2, there is shown a single data block 107. The active region of encoded data consists of an array of identically structured data blocks 107. Each of the data blocks has the following structure: a data region 108 surrounded by clock-marks 109, borders 110, and targets 111. The data region holds the encoded data proper, while the clock-marks, borders and targets are present specifically to help locate the data region and ensure accurate recovery of data from within the region.

Each data block 107 has dimensions of 627×394 dots. Of this, the central area of 595×384 dots is the data region 108. The surrounding dots are used to hold the clock-marks, borders, and targets.

Borders and Clockmarks

Figure 4:
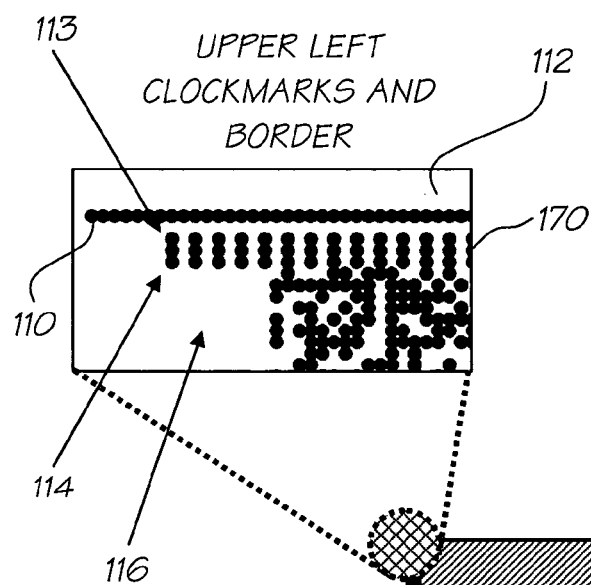
FIG. 4 and FIG. 5 illustrate magnified views of portions of the data block of FIG. 3.
Figure 5:
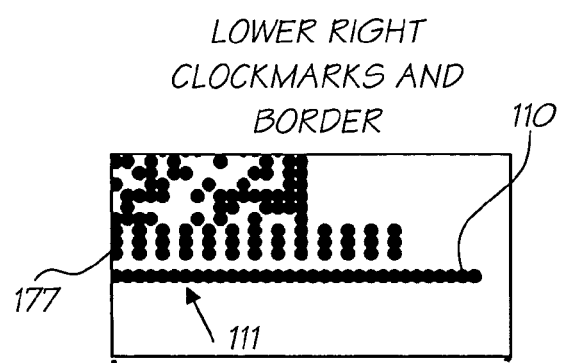
Figure 3:
FIG. 3 illustrates a single data block.

FIG. 3 illustrates a data block with FIG. 4 and FIG. 5 illustrating magnified edge portions thereof. As illustrated in FIG. 4 and FIG. 5, there are two 5 dot high border and clockmark regions 170, 177 in each data block: one above and one below the data region. For example, the top 5 dot high region consists of an outer black dot border line 112 (which stretches the length of the data block), a white dot separator line 113 (to ensure the border line is independent), and a 3 dot high set of clock marks 114. The clock marks alternate between a white and black row, starting with a black clock mark at the 8th column from either end of the data block. There is no separation between clockmark dots and dots in the data region.

The clock marks are symmetric in that if the encoded data is inserted rotated 180 degrees, the same relative border/clockmark regions will be encountered. The border 112, 113 is intended for use by an encoded data reader to keep vertical tracking as data is read from the data region. The clockmarks 114 are intended to keep horizontal tracking as data is read from the data region. The separation between the border and clockmarks by a white line of dots is desirable as a result of blurring occurring during reading. The border thus becomes a black line with white on either side, making for a good frequency response on reading. The clockmarks alternating between white and black have a similar result, except in the horizontal rather than the vertical dimension. Any encoded data reader must locate the clockmarks and border if it intends to use them for tracking. The next section deals with targets, which are designed to point the way to the clockmarks, border and data.

Targets in the Target Region

Figure 6:
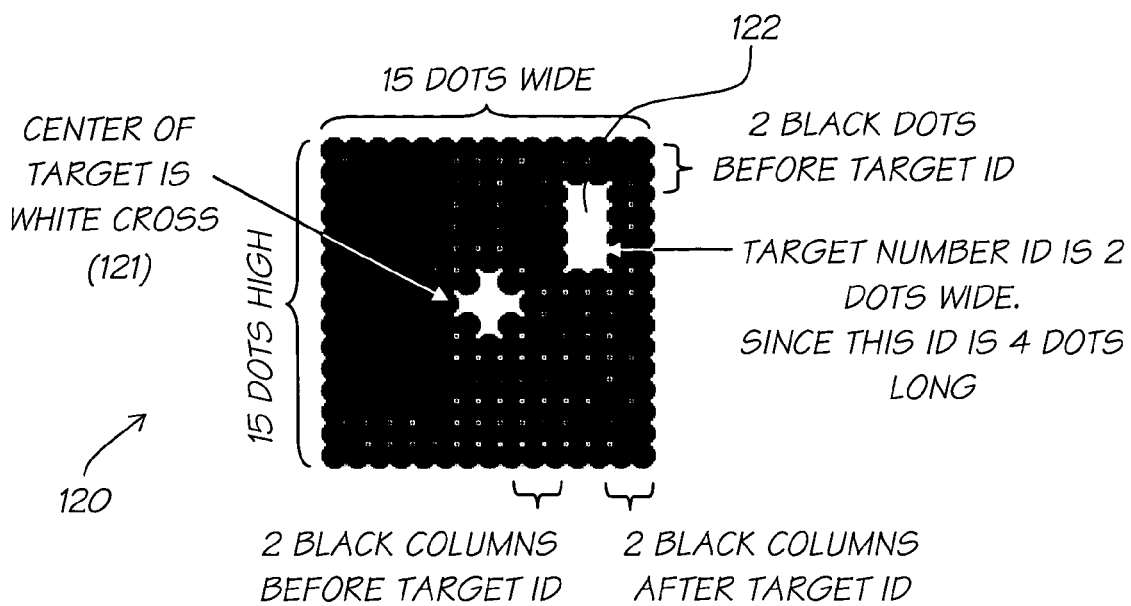
FIG. 6 illustrates a single target structure.
Figure 7:
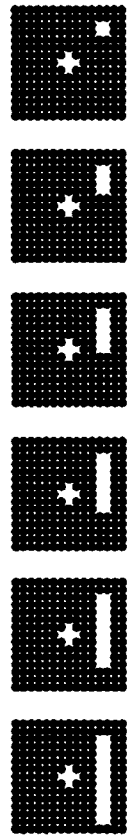
FIG. 7 illustrates the target structure of a data block.
Figure 7:
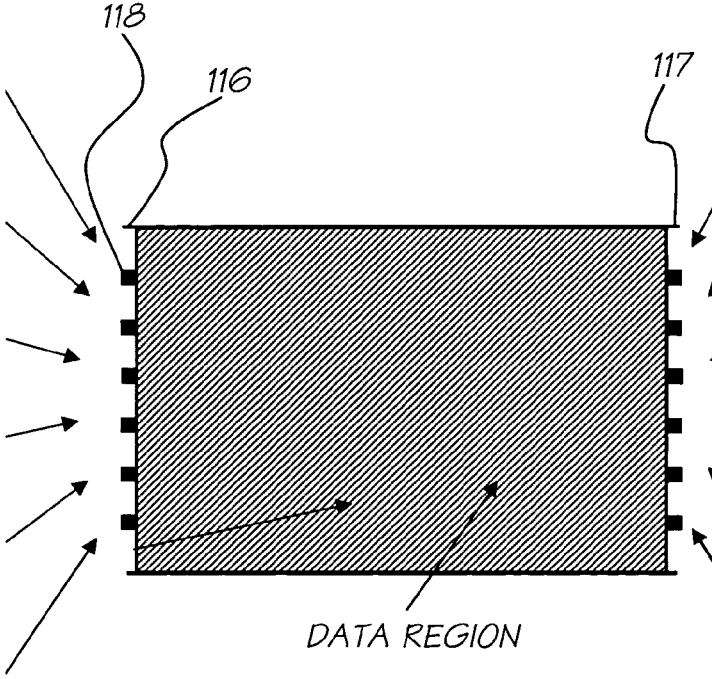
Figure 7:

As shown in FIG. 7, there are two 15-dot wide target regions 116, 117 in each data block: one to the left and one to the right of the data region. The target regions are separated from the data region by a single column of dots used for orientation. The purpose of the Target Regions 116, 117 is to point the way to the clockmarks, border and data regions. Each Target Region contains 6 targets e.g. 118 that are designed to be easy to find by an encoded data reader. Turning now to FIG. 6 there is shown the structure of a single target 120. Each target 120 is a 15×15 dot black square with a center structure 121 and a run-length encoded target number 122. The center structure 121 is a simple white cross, and the target number component 122 is simply two columns of white dots, each being 2 dots long for each part of the target number. Thus target number 1's target id 122 is 2 dots long, target number 2's target id 122 is 4 dots wide etc.

As shown in FIG. 7, the targets are arranged so that they are rotation invariant with regards to card insertion. This means that the left targets and right targets are the same, except rotated 180 degrees. In the left Target Region 116, the targets are arranged such that targets 1 to 6 are located top to bottom respectively. In the right Target Region, the targets are arranged so that target numbers 1 to 6 are located bottom to top. The target number id is always in the half closest to the data region. The magnified view portions of FIG. 7 reveals clearly the how the right targets are simply the same as the left targets, except rotated 180 degrees.

Figure 8:
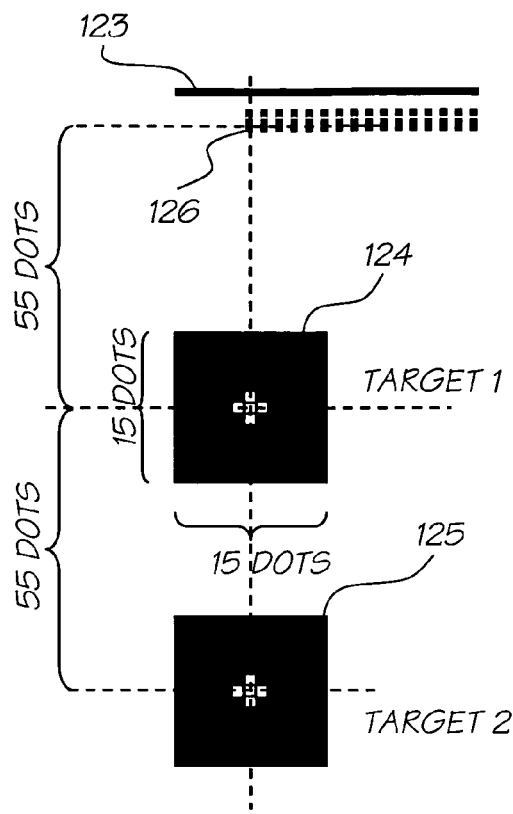
FIG. 8 illustrates the positional relationship of targets relative to border clocking regions of a data region.

As shown in FIG. 8, the targets 124, 125 are specifically placed within the Target Region with centers 55 dots apart. In addition, there is a distance of 55 dots from the center of target 1 (124) to the first clockmark dot 126 in the upper clockmark region, and a distance of 55 dots from the center of the target to the first clockmark dot in the lower clockmark region (not shown). The first black clockmark in both regions begins directly in line with the target center (the 8th dot position is the center of the 15 dot-wide target).

The simplified schematic illustrations of FIG. 8 illustrates the distances between target centers as well as the distance from Target 1 (124) to the first dot of the first black clockmark (126) in the upper border/clockmark region. Since there is a distance of 55 dots to the clockmarks from both the upper and lower targets, and both sides of the encoded data are symmetrical (rotated through 180 degrees), the card can be read left-to-right or right-to-left. Regardless of reading direction, the orientation does need to be determined in order to extract the data from the data region.

Orientation Columns

Figure 9:
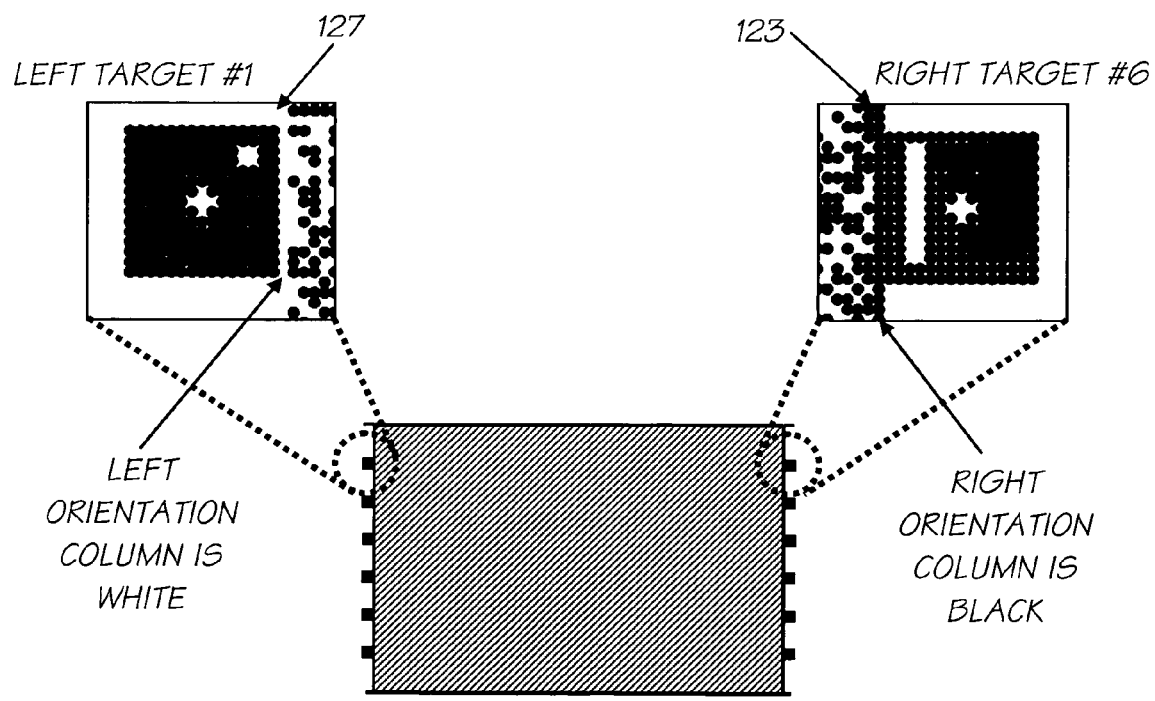
FIG. 9 illustrates the orientation columns of a datablock.

As illustrated in FIG. 9, there are two 1 dot wide Orientation Columns 127, 128 in each data block: one directly to the left and one directly to the right of the data region. The Orientation Columns are present to give orientation information to an encoded data reader: On the left side of the data region (to the right of the Left Targets) is a single column of white dots 127. On the right side of the data region (to the left of the Right Targets) is a single column of black dots 128. Since the targets are rotation invariant, these two columns of dots allow an encoded data reader to determine the orientation of the photograph—has the photograph been inserted the right way, or back to front.

From the encoded data reader's point of view, assuming no degradation to the dots, there are two possibilities:

If the column of dots to the left of the data region is white, and the column to the right of the data region is black, then the reader will know that the photograph has been inserted the same way as it was written.

If the column of dots to the left of the data region is black, and the column to the right of the data region is white, then the reader will know that the photograph has been inserted backwards, and the data region is appropriately rotated. The reader must take appropriate action to correctly recover the information from the photograph.

Data Region

As shown in FIG. 10, the data region of a data block consists of 595 columns of 384 dots each, for a total of 228,480 dots. These dots must be interpreted and decoded to yield the original data. Each dot represents a single bit, so the 228,480 dots represent 228,480 bits, or 28,560 bytes. The interpretation of each dot can be as follows:

| Black | 1 |
| White | 0 |

The actual interpretation of the bits derived from the dots, however, requires understanding of the mapping from the original data to the dots in the data regions of the photograph.

Mapping Original Data to Data Region Dots

There will now be described the process of taking an original data file of maximum size 2,986,206 bytes and mapping it to the dots in the data regions of the 210 data blocks on a 1600 dpi photograph. An encoded data reader would reverse the process in order to extract the original data from the dots on a photograph. At first glance it seems trivial to map data onto dots: binary data is comprised of 1s and 0s, so it would be possible to simply write black and white dots onto the card. This scheme however, does not allow for the fact that ink can fade, parts of a card may be damaged with dirt, grime, or even scratches. Without error-detection encoding, there is no way to detect if the data retrieved from the card is correct. And without redundancy encoding, there is no way to correct the detected errors. The aim of the mapping process then, is to make the data recovery highly robust, and also give the encoded data reader the ability to know it read the data correctly.

There are four basic steps involved in mapping an original data file to data region dots:

Compress the original data

Redundancy encode the compressed data

Shuffle the encoded data in a deterministic way to reduce the effect of localized encoded data damage Write out the shuffled, encoded data as dots to the data blocks on the photograph.

Each of these steps is examined in detail in the following sections.

Compress the Original Data

The data to be recorded on the photograph may comprise several blocks, e.g.

1) color image data
2) audio annotation data
3) image processing control script
4) position data (such as from a GPS receiver)
5) time and date
6) camera orientation
7) tracking data—such as ink cartridge information, software versions, camera identification, and so forth.

For a high quality image, the source image data may be 2000×3000 pixels, with 3 bytes per pixel. This results in 18 Mbytes of data, which is more than can be stored in infra-red dots on the photo. The image data can be compressed by a factor of around 10:1 with generally negligible reduction in image quality using an image compression technique. Suitable image compression techniques include JPEG compression based on discrete cosine transforms and Huffman coding, wavelet compression as used in the JPEG2000 standard or fractal compression.

With 10:1 compression, the 18 Mbytes of a high quality image results in 1.8 Mbytes of compressed data.

The audio annotation data can also be compressed using, for example, MP3 compression.

The image processing control scrip will typically not consume more than 10 Kbytes of data, with the exception of images embedded in the script. These images should generally be compressed. A suitable image processing script language designed for photograph processing is the 'Vark' language developed by the present applicant and disclosed in U.S. Ser. No. 09/113,070 (Docket No. ART02US). The remaining data is small, and need not be compressed.

Redundancy Encode Using Reed-Solomon Encoding

The mapping of data to encoded data dots relies heavily on the method of redundancy encoding employed. Reed-Solomon encoding is preferably chosen for its ability to deal with burst errors and effectively detect and correct errors using a minimum of redundancy. Reed Solomon encoding is adequately discussed in the standard texts such as Wicker, S., and Bhargava, V., 1994, Reed-Solomon Codes and their Applications, IEEE Press, Rorabaugh, C, 1996; Error Coding Cookbook, McGraw-Hill, Lyppens, H., 1997; Reed-Solomon Error Correction, Dr. Dobb's Journal, January 1997 (Volume 22, Issue 1).

A variety of different parameters for Reed-Solomon encoding can be used, including different symbol sizes and different levels of redundancy. Preferably, the following encoding parameters are used:

m=8
t=64

Having m=8 means that the symbol size is 8 bits (1 byte). It also means that each Reed-Solomon encoded block size n is 255 bytes ($2^8-1$ symbols). In order to allow correction of up to t symbols, 2t symbols in the final block size must be taken up with redundancy symbols. Having t=64 means that 64 bytes (symbols) can be corrected per block if they are in error. Each 255 byte block therefore has 128 (2×64) redundancy bytes, and the remaining 127 bytes (k=127) are used to hold original data. Thus:

n=255
k=127

The practical result is that 127 bytes of original data are encoded to become a 255-byte block of Reed-Solomon encoded data. The encoded 255-byte blocks are stored on the photograph and later decoded back to the original 127 bytes again by the encoded data reader. The 384 dots in a single column of a data block's data region can hold 48 bytes (384/8). 595 of these columns can hold 28,560 bytes. This amounts to 112 Reed-Solomon blocks (each block having 255 bytes). The 210 data blocks of a complete photograph can hold a total of 23,520 Reed-Solomon blocks (5,997,600 bytes, at 255 bytes per Reed-Solomon block). Two of the Reed-Solomon blocks are reserved for control information, but the remaining blocks are used to store data. Since each Reed-Solomon block holds 127 bytes of actual data, the total amount of data that can be stored on an photograph is 2,986,786 bytes (23,518×127). If the original data is less than this amount, the data can be encoded to fit an exact number of Reed-Solomon blocks, and then the encoded blocks can be replicated until all 23,518 blocks are used. FIG. 11 illustrates the overall form of encoding utilized.

Each of the 2 Control blocks 132, 133 contain the same encoded information required for decoding the remaining 23,518 Reed-Solomon blocks:

The number of Reed-Solomon blocks in a full message (16 bits stored lo/hi), and

The number of data bytes in the last Reed-Solomon block of the message (8 bits).

These two numbers are repeated 32 times (consuming. 96 bytes) with the remaining 31 bytes reserved and set to 0. Each control block is then Reed-Solomon encoded, turning the 127 bytes of control information into 255 bytes of Reed-Solomon encoded data.

The Control Block is stored twice to give greater chance of it surviving. In addition, the repetition of the data within the Control Block has particular significance when using Reed-Solomon encoding. In an uncorrupted Reed-Solomon encoded block, the first 127 bytes of data are exactly the original data, and can be looked at in an attempt to recover the original message if the Control Block fails decoding (more than 64 symbols are corrupted). Thus, if a Control Block fails decoding, it is possible to examine sets of 3 bytes in an effort to determine the most likely values for the 2 decoding parameters. It is not guaranteed to be recoverable, but it has a better chance through redundancy. Say the last 159 bytes of the Control Block are destroyed, and the first 96 bytes are perfectly ok. Looking at the first 96 bytes will show a repeating set of numbers. These numbers can be sensibly used to decode the remainder of the message in the remaining 23,518 Reed-Solomon blocks.

A hex representation of the 127 bytes in each Control Block data before being Reed-Solomon encoded would be as illustrated in FIG. 12.

Scramble the Encoded Data

Assuming all the encoded blocks have been stored contiguously in memory, a maximum 5,997,600 bytes of data can be stored on the photograph (2 Control Blocks and 23,518 information blocks, totaling 23,520 Reed-Solomon encoded blocks). Preferably, the data is not directly stored onto the photograph at this stage however, or all 255 bytes of one Reed-Solomon block will be physically together on the card. Any dirt, grime, or stain that causes physical damage to the card has the potential of damaging more than 64 bytes in a single Reed-Solomon block, which would make that block unrecoverable. If there are no duplicates of that Reed-Solomon block, then the entire photograph cannot be decoded.

Figure 13:
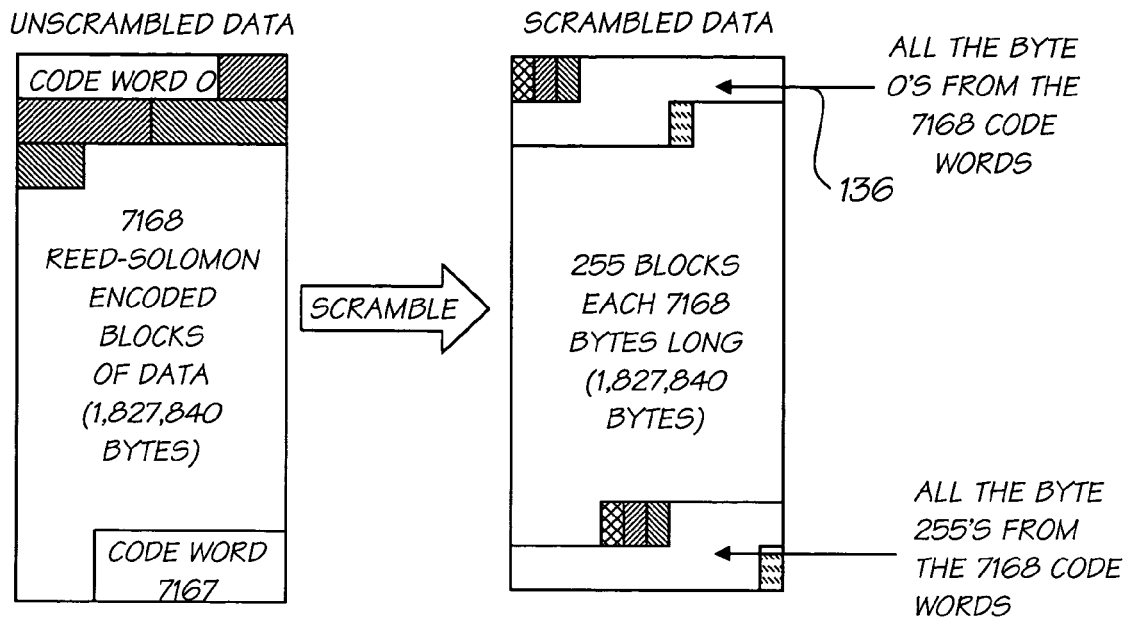
FIG. 13 illustrates the Reed-Solomon encoding process.

The solution is to take advantage of the fact that there are a large number of bytes on the photograph, and that the photograph has a reasonable physical size. The data can therefore be scrambled to ensure that symbols from a single Reed-Solomon block are not in close proximity to one another. Of course pathological cases of photograph degradation can cause Reed-Solomon blocks to be unrecoverable, but on average, the scrambling of data makes the data much more robust. The scrambling scheme chosen is simple and is illustrated schematically in FIG. 13. All the Byte 0s from each Reed-Solomon block are placed together 136, then all the Byte 1s etc. There will therefore be 23,520 byte 0's, then 23,520 Byte 1's etc. Each data block on the photograph can store 28,560 bytes. Consequently, there are approximately 4 bytes from each Reed-Solomon block in each of the data blocks on the photograph.

Under this scrambling scheme, complete damage to 16 entire data blocks on the photograph will result in 64 symbol errors per Reed-Solomon block. This means that if there is no other damage to the photograph, the entire data is completely recoverable, even if there is no data duplication.

Write the Scrambled Encoded Data to the Photograph

Once the original data has been Reed-Solomon encoded, duplicated, and scrambled, there are 5,997,600 bytes of data to be stored on the photograph. Each of the data blocks on the photograph stores 28,560 bytes.

The data is simply written out to the photograph data blocks so that the first data block contains the first 28,560 bytes of the scrambled data, the second data block contains the next 28,560 bytes etc.

Figure 14:
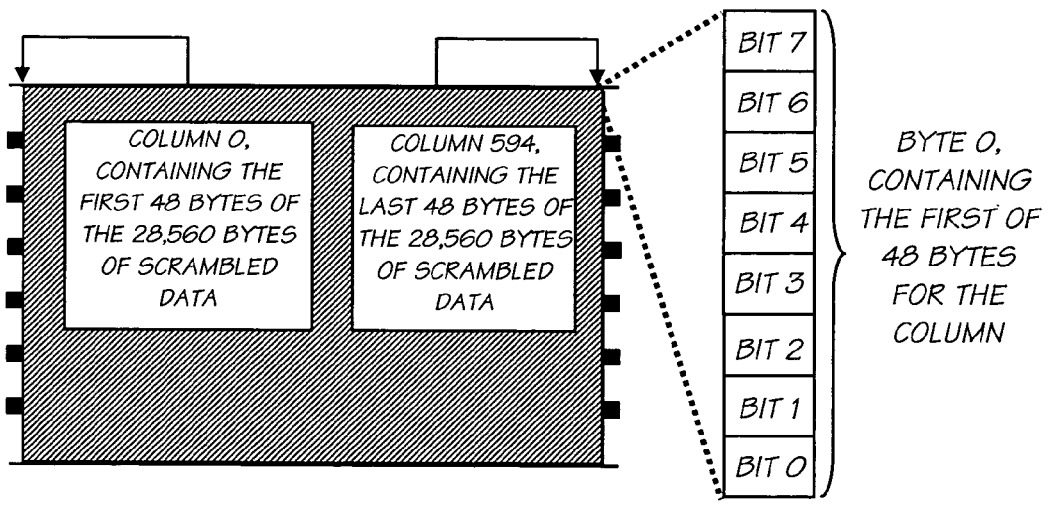
FIG. 14 illustrates the layout of encoded data within a datablock.

As illustrated in FIG. 14, within a data block, the data is written out column-wise left to right. Thus the left-most column within a data block contains the first 48 bytes of the 28,560 bytes of scrambled data, and the last column contains the last 48 bytes of the 28,560 bytes of scrambled data. Within a column, bytes are written out top to bottom, one bit at a time, starting from bit 7 and finishing with bit 0. If the bit is set (1), a black dot (IR ink dot) is placed on the photograph, if the bit is clear (0), no dot is placed on the photograph.

For example, a set of 5,997,600 bytes of data can be created by scrambling 23,520 Reed-Solomon encoded blocks to be stored onto an photograph. The first 28,560 bytes of data are written to the first data block. The first 48 bytes of the first 28,560 bytes are written to the first column of the data block, the next 48 bytes to the next column and so on. Suppose the first two bytes of the 28,560 bytes are hex D3 5F. Those first two bytes will be stored in column 0 of the data block. Bit 7 of byte 0 will be stored first, then bit 6 and so on. Then Bit 7 of byte 1 will be stored through to bit 0 of byte 1. Since each "1" is stored as a black dot, and each "0" as a white dot, these two bytes will be represented on the photograph as the following set of dots:

D3 (1101 0011) becomes: black, black, white, black, white, white, black, black 5F (0101 1111) becomes: white, black, white, black, black, black, black, black The encoded image data is sent to an ink jet printer to drive the infra-red ink jet nozzles while the image data is used to drive the cyan, magenta, and yellow color nozzles while the print media is driven through the printhead of the printer.

The encoded data of the image and its transformed version is sent to a printer means to drive the infra-red ink jet nozzles while the image data is used to drive the color nozzles while the print media is driven through the printhead of the printer means.

The image taken by the camera system is now available as a photographic image with the data necessary to reproduce that image printed therewith whether with or without the image transformed by the originally used image processing program. It is not necessary to separately locate the negative if another copy of the photogaph is desired, the image can be reproduced notwithstanding damage thereto and the image is available in a digital format which can be scanned into a computer system or a camera system, as disclosed in the applicant's co-pending applications, U.S. Pat. No. 6,476,863 and U.S. Pat. No. 6,459,495, for whatever purpose or the data transmitted over a telecommunications network.

Another type of format the so-called Artcard format is disclosed in applicant's co-pending applications U.S. Pat. No. 6,476,863 and U.S. Pat. No. 6,459,495 and may equally be used here in place of the "alternative Artcard" format as described above. In the Artcard format a continuous area of data is printed on the print media, in the present case, in infra-red ink on the photograph surrounded by margins printed as targets at the leading and trailing edges of the data area and as other indicia to specify borders and clockmarks along the top and bottom thereof to aid decoding of the data contained in the data area. The targets are used to confirm that the orientation of the card when read is not rotated more than 1° from the horizontal and to detect whether the card has been inserted front or back first. Otherwise the reading of the data would be unreliable.

The foregoing description has been limited to specific embodiments of this invention. It will be apparent, however, that variations and modifications may be made to the invention, with the attainment of some or all of the advantages of the invention. For example, it will be appreciated that the invention may be embodied in either hardware or software in a suitably programmed digital data processing system, both of which are readily accomplished by those of ordinary skill in the respective arts. Therefore, it is the object of the appended claims to cover all such variations and modifications as come within the true spirit and scope of the invention.

We claim:

1. A method of generating digital image data for reproduction of a photographic image, said method comprising the steps of:

providing a photograph having a photographic image and coded data printed thereon, wherein the coded data is superimposed with and printed on the same surface as the photographic image, said coded data encoding digital image data of the image represented in the photograph, and reading the coded data using a coded data reader; and decoding the read coded data to generate the digital image data, thereby enabling reproduction of the image from the photograph.

2. The method according to claim 1, wherein the image data is printed on the photograph with an infra-red absorbing ink.

3. The method according to claim 2, wherein the ink has negligible absorption in the visible spectrum.

4. The method of claim 1, wherein the image data is fault tolerant encoded.

5. The method of claim 4, wherein the image data is encoded using Reed-Solomon encoding.

* * * * *